US010607228B1

(12) United States Patent
Gai et al.

(10) Patent No.: US 10,607,228 B1
(45) Date of Patent: Mar. 31, 2020

(54) DYNAMIC RULE STRATEGY AND FRAUD DETECTION SYSTEM AND METHOD

(71) Applicant: JPMorgan Chase Bank, N.A., New York, NY (US)

(72) Inventors: Jiading Gai, Columbus, OH (US); Xiaoli Xu, Columbus, OH (US); Yang Yuan, Delaware, OH (US); Qi He, Columbus, OH (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 329 days.

(21) Appl. No.: 15/685,105

(22) Filed: Aug. 24, 2017

Related U.S. Application Data

(60) Provisional application No. 62/378,720, filed on Aug. 24, 2016.

(51) Int. Cl.
*G06Q 20/40* (2012.01)
*G06N 5/04* (2006.01)

(52) U.S. Cl.
CPC ......... *G06Q 20/4016* (2013.01); *G06N 5/046* (2013.01); *G06Q 20/405* (2013.01)

(58) Field of Classification Search
CPC .. G06Q 20/4016; G06Q 20/405; G06N 5/048; G06N 5/043; G06N 5/046
See application file for complete search history.

(56) References Cited

U.S. PATENT DOCUMENTS

| 7,937,336 B1* | 5/2011 | Maynard-Zhang ......................... H04L 29/1299 706/12 |
| 9,760,861 B2* | 9/2017 | Boding .................. G06Q 10/10 |
| 2007/0106580 A1* | 5/2007 | Yang .................... G06Q 20/042 705/35 |
| 2008/0162396 A1* | 7/2008 | Kerley .................. G06N 5/025 706/47 |
| 2011/0007366 A1* | 1/2011 | Sarkar ................ G06K 9/00456 358/462 |

(Continued)

FOREIGN PATENT DOCUMENTS

| EP | 3248844 A1 * | 11/2017 | ......... B60R 16/0231 |
| WO | WO-0244986 A2 * | 6/2002 | ............. G06Q 40/08 |

OTHER PUBLICATIONS

Patil et al.: Issues in Optimization of Decision Tree Learning: A Survey, Jul. 2012, International Journal of Applied Information Systems (IJAIS), vol. 3, No. 5, pp. 13-30 (Year: 2012).*

(Continued)

*Primary Examiner* — Bijendra K Shrestha
(74) *Attorney, Agent, or Firm* — Greenblum & Bernstein, P.L.C.

(57) ABSTRACT

A dynamic rule strategy and fraud detection method for detecting fraud trends is provided. The method includes storing captured transaction data in at least one data warehouse and utilizing a computer server including at least one processor for performing multiple steps. The steps include continuously monitoring the captured transaction data for detecting a concentration of fraud attacks in selected segments; receiving, the selected segments identified and developing a set of fraud detection rules based on the selected segments; and validating and implementing the fraud detection rules.

17 Claims, 5 Drawing Sheets

(56) References Cited

U.S. PATENT DOCUMENTS

| | | | | |
|---|---|---|---|---|
| 2012/0101930 A1* | 4/2012 | Li | ............................ | G06Q 40/00 |
| | | | | 705/35 |
| 2013/0054438 A1* | 2/2013 | Boding | .............. | G06Q 20/4016 |
| | | | | 705/35 |
| 2014/0081652 A1* | 3/2014 | Klindworth | ............ | G06Q 10/10 |
| | | | | 705/2 |
| 2014/0155411 A1* | 6/2014 | Ochsner | ................ | C12Q 1/6883 |
| | | | | 514/254.11 |
| 2014/0257846 A1* | 9/2014 | Hermiz | ................. | G06F 19/328 |
| | | | | 705/3 |

OTHER PUBLICATIONS

Entrust Inc.: Fighting Fraud in Today's Connected World: Critical Approach to Affordable Fraud Detection, Jul. 2009, pp. 1-21. (Year: 2009).*

Business Wire: Unisys Real Time Technology Helps Banorte Improve Detection of Fraud, Identity Theft and Money Laundering May 1, 2006, pp. 1-4 (Year: 2006).*

Mortgage Banking: CoreLogic incorporates FICO technology into LoanSafe Fraud Manager, Sep. 2011, pp. 1-3 (Year: 2011).*

* cited by examiner

DYNAMIC RULE STRATEGY AND FRAUD DETECTION SYSTEM AND METHOD

RELATED APPLICATIONS

This application claims priority to U.S. Provisional Patent Application Ser. No. 62/378,720, filed on Aug. 24, 2016.

TECHNICAL FIELD

Embodiments of the invention are related generally to systems and method for fraud rule development and detecting fraud.

BACKGROUND OF THE INVENTION

Fraud in many industries, including, for example, the financial services industry, has become increasingly sophisticated. While concerned industries continue to develop and deploy anti-fraud measures, fraudsters continually create strategies to evade the anti-fraud measures.

Fraud rule development is critical to the current fraud prevention environment. A key factor of successful fraud rule development is a rapid reaction to the most recent fraud trend, thereby quickly detecting the new fraud trend and preventing fraud attempts based on the new fraud trend in order to reduce fraud loss over time.

Existing procedures of building fraud rule strategies for fraud channels are manual with multiple human interactions. Fraud analysts look for potential fraud trends using several separate fraud reports, individually pulling data for identified target sections, segments, divisions, or areas, exploring data in more detail and potentially further conducting data analytics through multi-dimensional division and selecting key fraud drivers/attributes for rule/strategy development. After the rule/strategy is developed, analysts send the rule strategy to management for approval and to information technology experts for implementation.

The above-described process is time consuming. The process may require an extensive time period, during which the fraud attack will be ongoing. Fraudsters are rational, and will not continue to attempt transactions that are declined. While the existing technology has the capability to recognize recurring fraud patterns, the constant adaptation by fraudsters provides the fraudsters with a speed advantage over the currently existing lengthy rule development cycles.

Accordingly, an opportunity exists to significantly enhance fraud rule development efficiency by introducing a dynamic, configurable, and industry-leading framework that automates the short-term combat with fraudsters. The system should be equipped to quickly capture existing and emerging fraud attacks at a relatively granular level and create effective fraud rules to combat most recent fraud trend. The system should further enable comprehensive fraud trend monitoring and enforce effectiveness of fraud rule development.

SUMMARY OF THE INVENTION

In one aspect, the invention includes a fraud rule development and detection system for detecting fraud trends. The system includes at least one computer memory storing transaction data and at least one computer server including at least one processor for executing multiple components. An automated trigger identification engine continuously monitors captured transaction data in order to detect a concentration of fraud attacks in selected areas. An adaptive rule induction engine receives the selected areas identified by the automated trigger identification engine and develops a set of fraud detection rules based on the selected areas. Additionally, a control engine validates and implements the fraud detection rules.

In an additional aspect, a dynamic rule development strategy and fraud detection method is provided for detecting fraud trends. The method comprises storing captured transaction data in at least one data warehouse and utilizing a computer server including at least one processor for performing multiple steps. The steps include continuously monitoring the captured transaction data using an automated trigger identification engine for detecting a concentration of fraud attacks in selected areas; receiving, at an adaptive rule engine, the selected areas identified by the automated trigger identification engine and developing a set of fraud detection rules based on the selected areas; and validating and implementing the fraud detection rules using a control engine.

In aspects of the invention, the adaptive rule induction engine utilizes an in-house designed tree-based classification method to differentiate the fraud risk among transactions.

BRIEF DESCRIPTION OF THE DRAWINGS

Embodiments of the present invention are described in detail below with reference to the attached drawings figures, wherein.

DETAILED DESCRIPTION OF PREFERRED EMBODIMENTS

Embodiments of the present invention are directed to a system and method for combatting fraud using a dynamic rule strategy designed and developed to reduce the time frame for fraud trend detection, data preparation, and strategy development. The strategy results in a reduction of reaction time to emergent fraud trends and thus also a reduction in consequent fraud loss. Embodiments of the invention can be enhanced to support the big data analytic lifecycle and can be used as a platform to host multiple modern data mining approaches.

Figure 1:
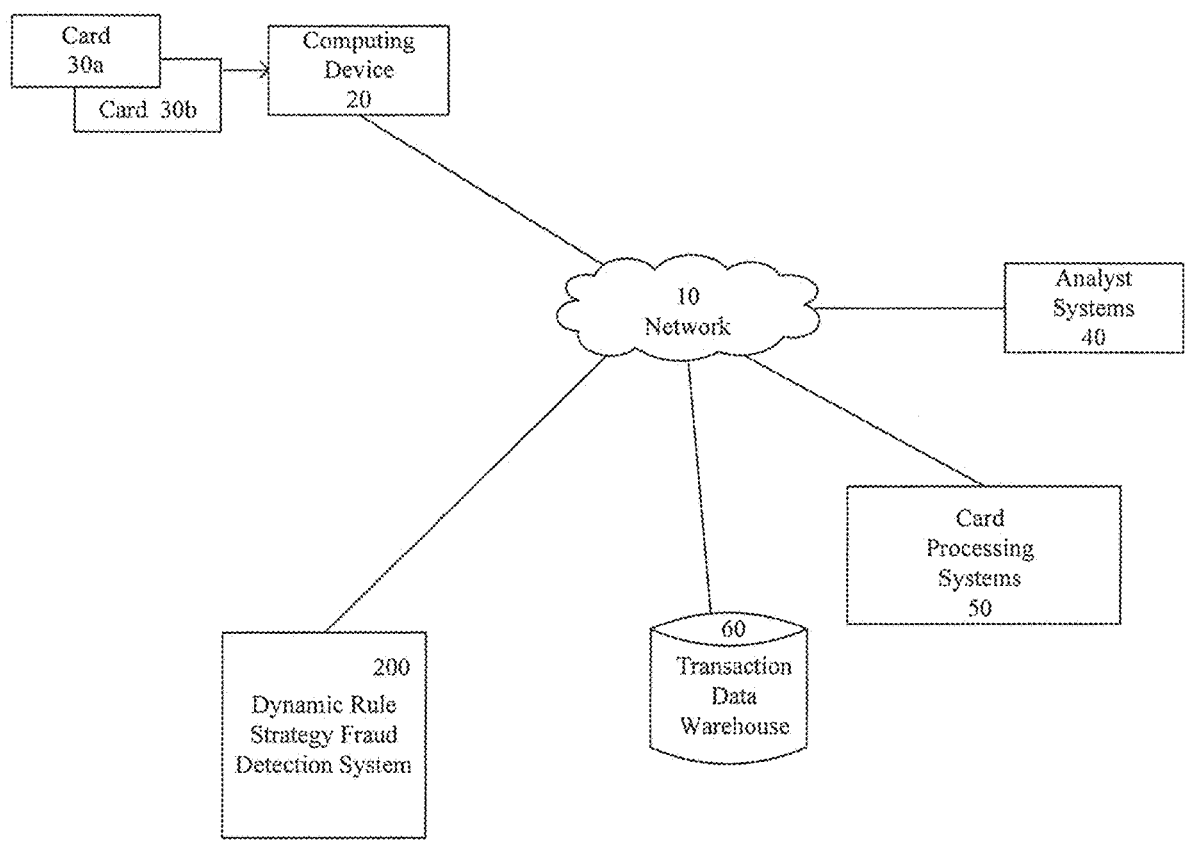
FIG. 1 is a block diagram illustrating an operating environment for a dynamic rule strategy fraud detection system in accordance with an embodiment of the invention.

FIG. 1 is a block diagram illustrating an operating environment for a dynamic rule strategy fraud detection system in accordance with an embodiment of the invention. The displayed embodiment has particular applicability to payment card transactions. However, it should be understood that the operating environment can be configured to facilitate fraud detection and prevention for any type of transaction. Card transactions using cards 30a, 30b are processed by a computing device 20 and transmitted over a network 10. Card processing systems 50 are connected over the network 10 to process the card transactions. A transaction data warehouse 60, analyst systems 40, and a dynamic rule strategy fraud detection system 200 may also be connected over the network 10.

The network 10 is shown as one network but may include multiple networks of diverse types connecting the different components. Networks may include a wired or wireless local area network (LAN) and a wide area network (WAN), wireless personal area network (PAN) and other types of networks. Computers may be connected over the Internet, an Intranet, Extranet, Ethernet, or any other system that provides communications. Some suitable communications protocols may include TCP/IP, UDP, or OSI for example. For wireless communications, communications protocols may include Bluetooth, Zigbee, IrDa or other suitable protocol. Furthermore, components of the system may communicate through a combination of wired or wireless paths.

The cards 30a, 30b may be payment cards, which may include, for example, debit cards, credit cards, or other types of bank cards. The cards may include magnetic stripes, chip technology, a combination of the two, or other emergent technologies. Additionally, while the cards are shown as physical cards, the fraud detection system is effective in detecting and combatting fraud for transactions during which the card is not necessarily present, such as Internet transactions or telephone transactions.

The computing device 20 may be or include any computing device adapted to receive and transmit payment information. Thus the computing device 20 includes at least one processor and one or more applications executed on the processor. The computing device 20 may receive the payment card information entered through a user interface online, such as by entering data such as a card number, expiration date, and security code, or may be used at a payment device activated terminal (e.g., automated teller machine ("ATMs"), point of sale ("POS") terminal, and the like). The computing device 20 may include a browser for accessing software applications provided by a host system or other connected systems that offer such functionality over the Internet or any other network. The computing device 20 may additionally be or include a mobile system, such as a smart phone, tablet, or other portable computing apparatus. Mobile computing systems may execute downloadable applications for operating in conjunction with connected systems. The downloadable applications may be stored in memory and executed by processors on the mobile systems and may provide a plurality of user interfaces.

The card processing systems 50 may be or include systems utilized for processing credit card transactions as currently known in the art. The analyst systems 40 may be computing devices similar to those described above. The analyst systems 40 preferably allow analysts to interact with the dynamic rule strategy and fraud detection system through user interfaces providing for interactivity between the systems.

The transaction data warehouse 60 may be or include a memory structure capable of storing large amounts of data. The stored data in the input and output databases may be structured, semi-structured, or unstructured. The data storage areas may include file systems and databases for storing large amounts of data. For example, the data storage areas may include HP 3PAR StoreSery® Storage systems. Those of ordinary skill in the art will appreciate that other computer storage systems for storing large amounts of data may be implemented. Data stored in the data storage areas may be managed and communicated with an Object-Relational Database Management System, such as Postgre® or other Object-Relational Database Management Systems that are known in the art. Multiple data storage areas may have different structures and store different types of data. For example, unstructured data may be stored separately from cleansed and structured data.

The dynamic rule strategy fraud detection system 200 is capable of quickly detecting fraud trends and combatting fraud through rule development and subsequent implementation. Details of this system are further described with respect to FIG. 2. The system automatically identifies new fraud trends and/or emerging fraud attacks, automatically constructs associated development data for strategy creation, and automatically conducts rule induction. In embodiments of the invention, the rule induction may be conducted using a tree-based classification method. Ultimately, the dynamic rule strategy and fraud detection system may be implemented in a production system to fully realize the power of combining advanced methodology, automation, and big data analytics in fraud space. The dynamic rule strategy provides an automatic framework to develop fraud rules. During each execution, the dynamic rule strategy pulls recent transactional data and performs fraud rule development. Therefore, new attributes may be selected and new rules developed every time the dynamic rule strategy executes.

Figure 2:
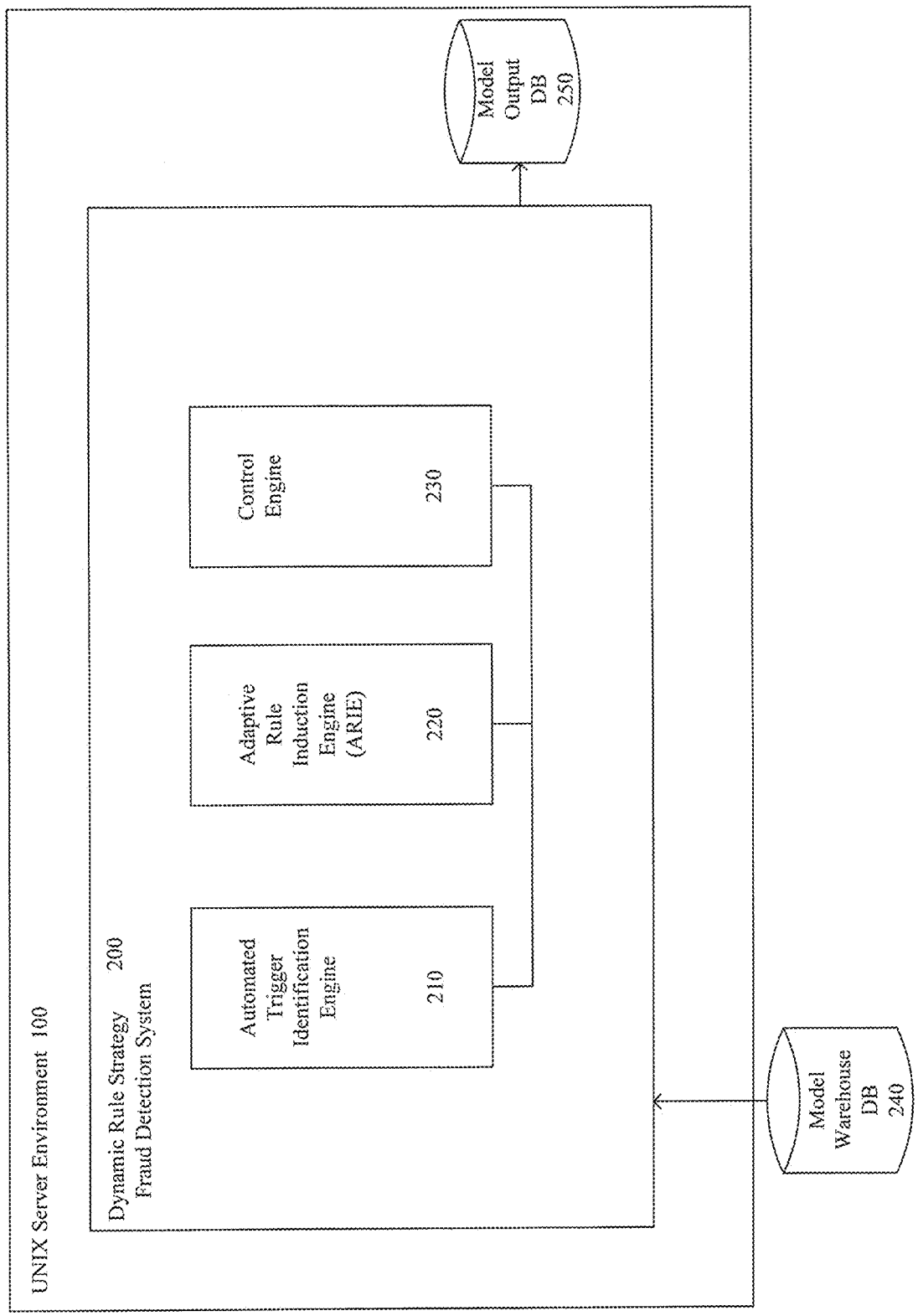
FIG. 2 is a block diagram illustrating components of a dynamic rule strategy fraud detection system in accordance with embodiments of the invention.

FIG. 2 is a block diagram illustrating components of the dynamic rule strategy fraud detection system 200 in accordance with embodiments of the invention The dynamic rule strategy and fraud detection system 200 may be included in a host system or platform at a financial services firm, a financial institution or other institution with an interest in combatting fraud. Accordingly, the host system may include, for example financial management systems, secure entry systems, data access systems, account processing systems, credit card processing systems, and other known systems.

As illustrated in FIG. 2, the host system may include a UNIX Server environment 100 or other type of server environment hosting the dynamic rule strategy and fraud detection system 200. The dynamic rule strategy fraud detection system 200 may include an automated trigger identification engine 210, an adaptive rule interaction engine (ARIE) 220, and a control engine 230. The dynamic rule strategy fraud detection system 200 may include or access a model warehouse database 240 and may send output to a model output database 250. Thus, any time the dynamic rule strategy executes, three major steps are executed using the automated trigger identification engine 210, adaptive rule induction engine 220, and control engine 230.

The automated trigger identification engine 210 achieves identification through segmentation. Segmentation is intended to capture potential concentrations of ongoing fraud attacks at a relatively granular level. There are multiple ways to segment the portfolio of transactions. In embodiments of the invention, the segments may be user-defined such that segments uniquely vulnerable to fraud can be isolated. For each dynamic rule strategy execution, a period of transactional data is used in automated trigger identification. The fraud observation window is from the time of the transaction to the execution of dynamic rule strategy. Multiple metrics by segment are calculated for fraud reporting and trigger identification throughout the target period. The length of all periods can be user defined.

The metrics of the target period may be used for high risk segment detection based on trigger criteria, and the metrics of a historical transaction window will be used for comparison with the target period to monitor fraud trend changes over time. The output of this procedure is high risk segments identified throughout the target period.

Thus, a purpose of trigger event detection is to identify a potential concentration of fraud attacks/alerts in each individual pre-defined segment by monitoring fraud unit rate, fraud amount rate, and fraud amount variance. Example criteria may be (Fraud unit rate >=2%, or Fraud amount rate >=2%, or increased $200K+ in weekly fraud compare to historical average excluding the highest) which represents a fairly concentrated fraud trend for each alerted segment. The criteria of potential concentration of fraud attacks/alert could be customized based on business input. The output of this automated trigger notification procedure is high risk segments with fraud concentration based on trigger event criteria. High risk segments are a subset of all the pre-defined segments, and they are selected through automated trigger identification for rule induction based on the analysis of the most recent historical transaction window.

Thus, the automated trigger identification engine 210 pulls all approved transactions and analyzes them to identify a high risk population in terms of fraud concentration based on customized trigger criteria. Once the high risk population is identified, the Adaptive Rule Induction Engine (ARIE) 220 automatically executes and models the high risk population to transform observed fraud trends to fraud rules. Once the ARIE 220 generates fraud rules, the control engine 230 implements out of time validation, implementation testing, business review, and potential analyst review before the each fraud rule is implemented in the production system.

The ARIE 220 executes and models on high risk segments identified by automated trigger identification, and/or on the user defined segments which are designed to directly call ARIE. In embodiments of the invention, the ARIE 220 is developed in C++ but various alternative languages can be used. The ARIE 220 is specially designed and fine-tuned to enhance results for fast fraud detection analytics. It supports high-speed pervasive deployment and is highly reconfigurable with user-defined customization, allowing prediction and scoring on a massive scale. The ARIE 220 can be used as a foundation of many modern data mining approaches based on bagging and boosting.

The ARIE 220 takes the output of the automatic trigger identification procedure as input including high risk and user defined segments, with sampling and data treatment applied. The algorithm of the ARIE 220 may include a tree-based classification method which is a flexible and simple technique to provide clear output. The algorithm is particularly powerful in fraud modeling and strategy analysis given its data-driven nature. It can handle missing values and is not sensitive to outliers. Given the underlying nature of fraud prevention where multiple risk drivers are integrated to represent the target, the tree-based classification method is a good tool for direct variable interaction. Thus, the tree-based classification method is leveraged to differentiate the risk of card transactions or other applicable types of transactions. With tree-based classification, the ARIE 220 can rank the likelihood of fraudulent transactions based on the probability, which will be used to facilitate the generation of fraud rules.

The control engine 230 plays an important role in enhancing the control process of the dynamic rule strategy model. It takes the output fraud rules of the ARIE 220 to validate the model using full validation data output through automated trigger identification. The control engine 230 may further utilize the Monte Carlo Cross Validation techniques for stability tests and send the rules for analyst review. In the unlikely scenario that the dynamic rule strategy of the ARIE 220 does not create valid rules, a fraud analyst may perform additional manual fraud review and analysis.

Once the dynamic rule strategy is implemented in the server, the fraud rules generated can be implemented by business and incorporated in production systems, and fraud rule implementation can be accomplished through a separate implementation process. Overall, the dynamic rule strategy is a framework/process to create fraud rules by detecting fraud concentrations and developing a decision tree model. The output of the model can be used to identify a group of transactions that will be potentially declined based on estimated probability of fraud.

The model warehouse database 240 stores all of the input data for use with the dynamic rule strategy fraud detection system 200. Inputs for development of the dynamic rule strategy may be derived from analysis of point of sale (POS) authorization data or other data in accordance with the particular fraud channel. Inputs are valued as of the time that an authorization was received and a decision was made. Inputs may include for example, data relevant to all of the approved transactions during the course of a day or other selected time period.

The model output database 250 stores outputs of the dynamic rule strategy fraud detection system 200. The outputs include a score and rules associated with the score. The score represents the probability (between 0.0 and 1.0) that a POS transaction is fraudulent.

Figure 3:
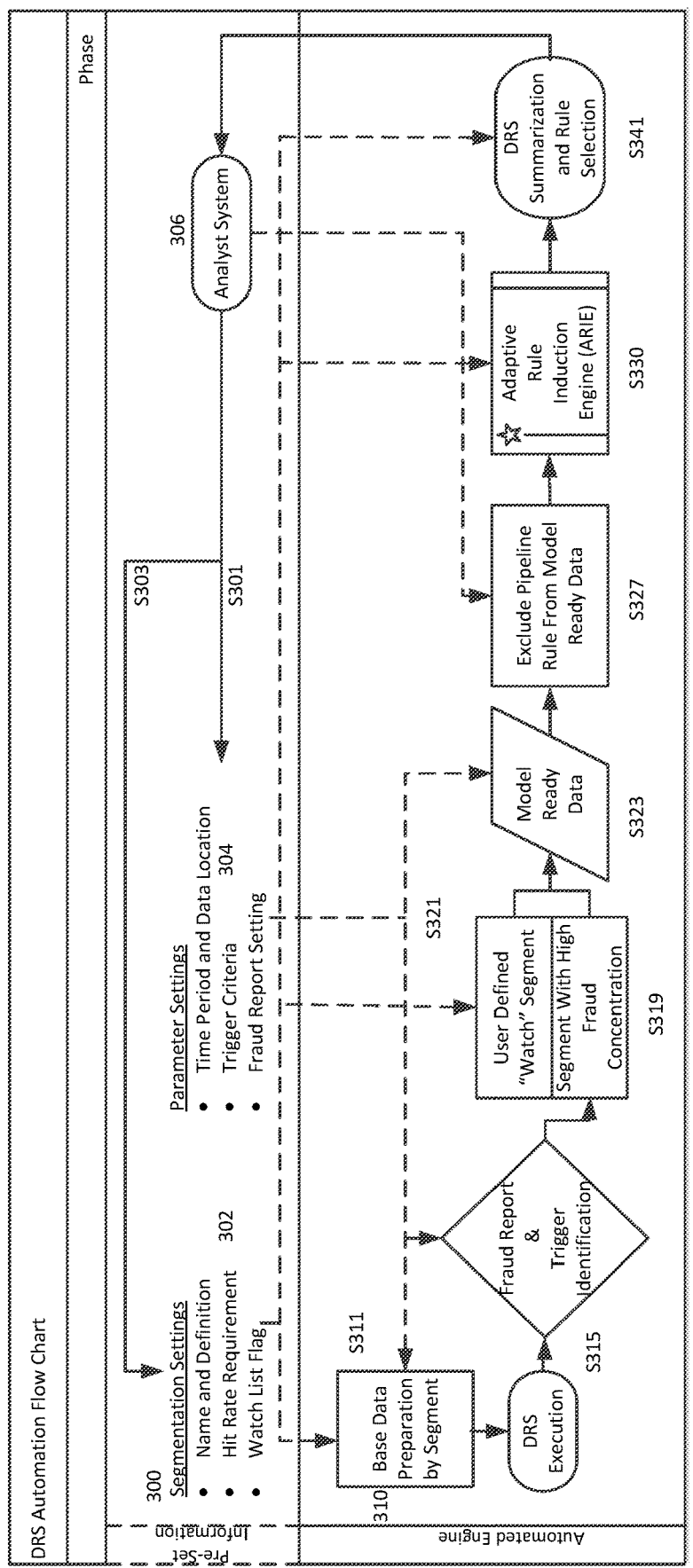
FIG. 3 is a flow chart illustrating operation of the dynamic rule strategy fraud detection system in accordance with an embodiment of the invention.

FIG. 3 is a flow chart illustrating operation of the dynamic rule strategy fraud detection system in accordance with an embodiment of the invention. In order to efficiently combat fraud, the running of the system occurs periodically, for example daily, and the results may be evaluated at the time of running. For any particular run, the strategy will execute automatically after a button click given all parameters are set up in the appropriate location, such as in a configuration file in the UNIX environment, LINUX environment, or other server environment. Pre-set information 300 includes segmentation settings 302 and parameter settings 304, which may be set by an analyst system 306 at S303 and S301 respectively. In embodiments of the invention, an analyst system may provide a user interface transmitted over a network allowing the analyst to utilize single button actuation to initiate the dynamic rule strategy fraud detection process. Additionally, the dynamic rule strategy and fraud detection system may provide user interfaces implemented by analysts for performing tasks such as refreshing transaction data, setting the time period of fraud reporting and model ready data, including end date, length of cycle in days, number of reporting cycles etc. User interfaces may additionally be provided to enable the analyst model target variables, trigger event criteria, and adjust the development data sample rate and ratio of development to validation within a cycle as well as customizing selections of divisions or segments.

Dynamic rule strategy automated flow is illustrated at 310. In S311, the system performs base data preparation by segment. In S313, the system performs dynamic rule strategy execution.

In S315, the system performs trigger identification and generates a fraud report. The fraud report may be in a spreadsheet format and its dataset may include, for example: the total number and dollar amount of approved transactions by segment, the total number and dollar amount of approved fraud transactions by segment, fraud unit and amount rate by segment, and fraud amount variance.

In S319, the system denotes segments, for example as user defined watch segments or as segments with high fraud concentration. User defined segments may include segments that user wants to monitor and model continuously using ARIE regardless of whether the segments are identified as risky by the automated trigger engine. These segments may be designated, for example, if a user believes that these segments are generally at risk. Those segments as well as model ready data (S323) associated will also be sent to ARIE for rule induction. To prepare for data to be sent to ARIE, separate model ready data with all available attributes will be pulled for the alerted high risk segments, or user defined segments. Both development and validation data may be pulled in this procedure. In S327, in order to ensure pure model saving, pipeline rule impact is excluded. The output of this procedure will be the input to the ARIE. In S330, the ARIE operates as will further describe below and outputs a summary and rule selection in S341, which are displayable on a user interface of the analyst system at 306.

Figure 4:
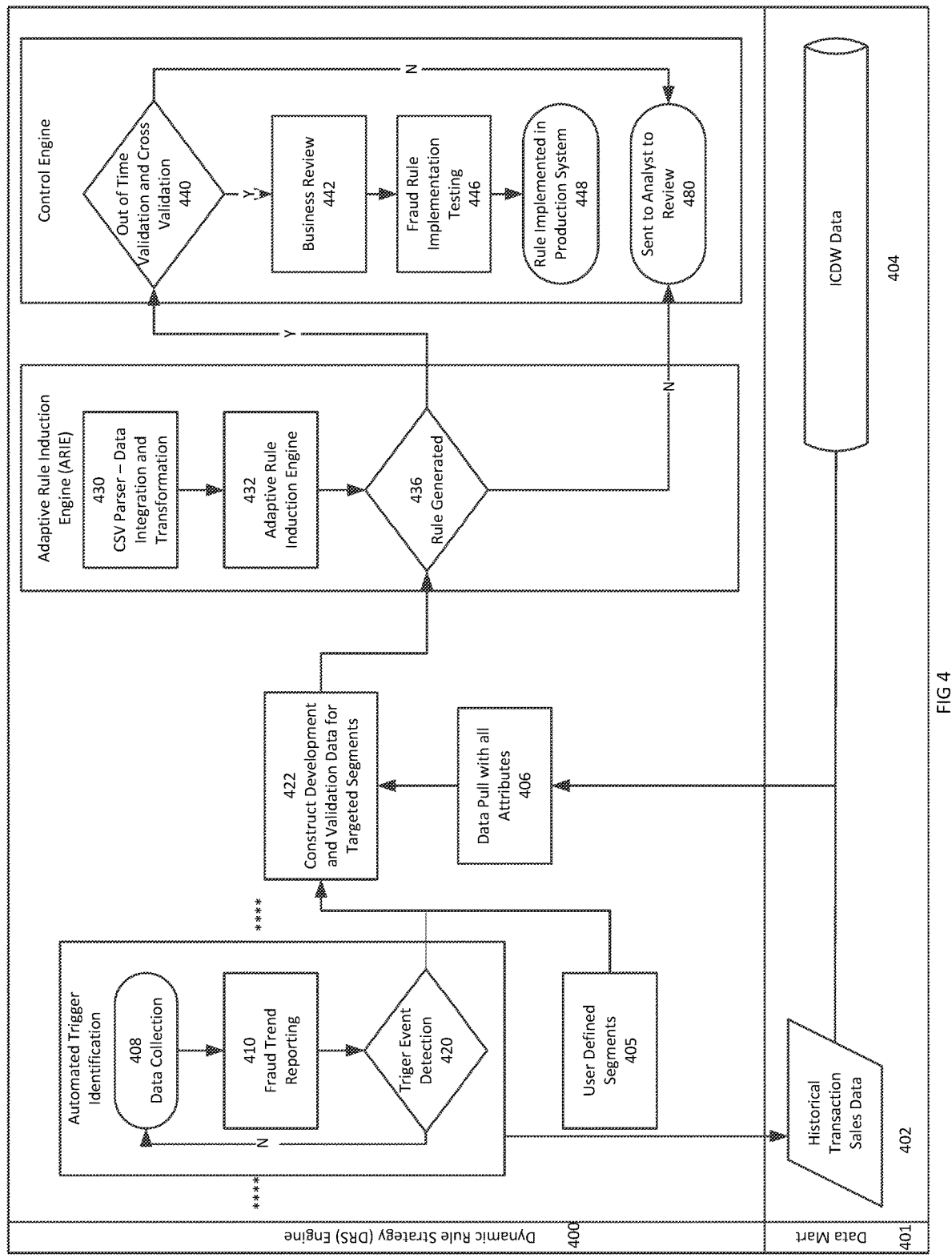
FIG. 4 is a flow chart illustrating operation of the dynamic rule strategy fraud detection system by component in accordance with an embodiment of the invention.

FIG. 4 is a flow chart illustrating operation of the dynamic rule strategy fraud detection system by component in accordance with an embodiment of the invention. A data mart 401 includes historical transaction data 402 and data warehouse data 404. The data from the data mart 401 is pulled by the dynamic rule strategy system 400 for analysis at 408. With respect to data collection, all daily approved transactions are pulled from data warehouse 404 for further segmentation to perform fraud trend reporting at block 410 and trigger event detection at block 420.

The result of trigger event detection 420 including high fraud concentration segments and the user-defined segments 405 is determined to help fraud concentration be identified at a more granular level to prepare for rule induction (decision tree development). Given the nature of fraud prevention, the list of segments and associated segmentation definitions are expected to be dynamic and evolving.

The fraud trend reporting in block 410 summarizes transactional level data by segment with respect to multiple metrics. Summarization may occur periodically, for example at a weekly level with respect to, for example: total number of approved transactions total dollar amount of approved transactions; total number of approved fraud transactions (where the fraud observation window may be defined as beginning at the time of the transaction and ending with the execution time of the dynamic rule strategy); total dollars of approved fraud transactions; fraud unit rate: calculated by total number of approved fraud transactions/total number of approved transactions; fraud amount rate: calculated by total dollars of approved fraud transactions/total dollars of approved transactions; and fraud amount variance compared over a pre-set period.

Blocks 408, 410, and 420 are performed by the automated trigger identification engine, which collects data at 408, performs fraud trend reporting at 410 and trigger event detection at 420. If trigger event detection detects segments in block 420, the segments are forwarded to block 422 for construction of development and validation data for the targeted segments. If event detection is triggered in block 420, data collection continues in block 408. In addition to segments identified through automated trigger identification at 422, the ARIE may operate on user defined segments 405, as described above, and pull additional data with attributes at 406.

Upon receipt of the selected segments, the ARIE performs parsing in block 430 prior to rule formulation in block 432. (Rule formulation is further described below with respect to FIG. 5.) A rule may be generated in block 436. If no rule is generated, the determination is delivered to the control engine and sent for analyst review in block 480. Although the dynamic rule strategy provides for automatic rule generation, the algorithm, which may be tree-based or another type of algorithm, might not be able to capture some potential fraud trends. In this situation, the fraud analyst will review the detected high risk segments manually at 480 to find potential fraud prevention opportunities.

If a rule or several rules are generated in block 436, it is sent to the control engine for validation in block 440. If the validation fails with unreasonable results, the rule is sent to block 480 for analyst review. If the validation occurs with reasonable results, the rule is then sent for business review in block 442 and fraud rule implementation testing in block 446. Business computing systems may take all the rules from the ARIE in 442, look at result of out of time validation, and review and select rules. Selection may be based on combination of individual rule performance (False Positive Rate, rule benefit in dollar amount) and operation capacity (# of expected out sorts). In block 446, once rules are selected, fraud rule implementation testing may be performed. Once implementation testing is successful, businesses may implement selected rules in the production system. Finally, the rule is implemented in the production system in block 448. Transfer of validated rules to the production system may occur automatically in order to further reduce the reaction time in response to emerging fraud trends.

Figure 5:
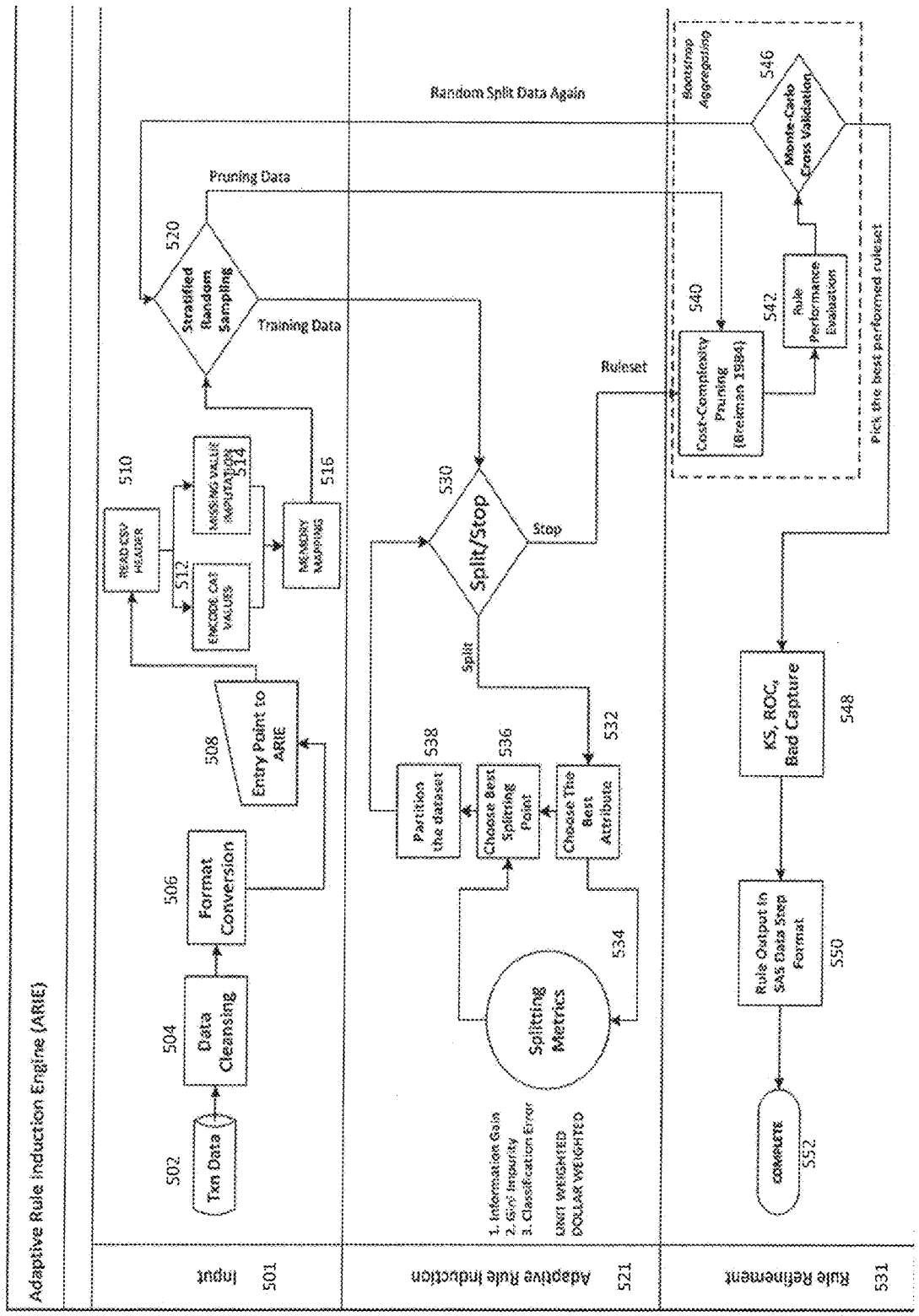
FIG. 5 is a flow chart illustrating detailed operation of the adaptive rule engine (ARIE) in accordance with an embodiment of the invention.

FIG. 5 illustrates further details of the operation of the ARIE. The operation is illustrated in three phases including an input phase 501, an adaptive rule induction 521 phase, and a rule refinement phase 531. In the input phase the data from the automated trigger identification engine is produced in block 502. The data is cleansed in block 504 and the data format may be converted in block 506. With respect to data cleansing, categorical predictors with over a pre-set number of levels are excluded from the development dataset.

Entry of the data to the ARIE occurs in block 508. The data is processed in blocks 510, 512, 514, and 516 through reading of the csv (comma separated values) header, encoding of categorical levels, imputation of missing values and memory mapping. For a categorical input variable, a new category representing missing values is created for the duration of the tree growing. For a continuous input variable, missing values are imputed with a constant value, such as DBL_MAX, which denotes the maximum finite representable floating-point number for the duration of the tree growing. The ARIE performs stratified random sampling in block 520.

The outputs of stratified random sampling in block 520 are directed both to the adaptive rule induction phase 521 and the rule refinement phase 531. For example, training data derived from the stratified random sampling is directed to split/stop determination block 530. If the determination is "split", the ARIE proceeds to blocks 532, 534, 536, and 538 for splitting metrics at block 534 to choose the best attribute at block 532, the best splitting point at block 536, and partition the data set at block 538. If the determination is "stop", then the ruleset is sent to the rule refinement phase 531.

Splits may be selected using the Gini Impurity (GI) criterion. The GI criterion is a measure of how often a randomly chosen element from the set would be incorrectly labeled if it were randomly labeled according to the distribution of labels in the subset. Gini Impurity can be computed by summing the probability of each transaction being chosen times the probability of a mistake in categorizing that transaction. It reaches its minimum (zero) when all transactions in a node fall into a single category. The ARIE may implement the unit weighted version of the splitting criterion, where the GI calculation counts the unit of each transaction. Alternatively, ARIE may utilize to use a reweighted version of the GI splitting criterion, where each transaction is assigned a different weight (e.g., transaction amount). Different procedures for splitting may be implemented for continuous vs. categorical variables.

With respect to stopping criteria, the tree growing or splitting phase continues until one of the following stopping criteria is hit: 1) All transactions in the node belong to a single target class; 2) If the node were split, the number of transactions in one or both of the child nodes would be less than a preset threshold. In an embodiment of the invention, the default threshold is 0.01% of the total transactions in the train dataset, windowed within [5, 5000]. This threshold may be specified through a tunable parameter, which can be tuned to fit individual application needs or any changing pattern of data; or 3) The best split is not greater than a certain pre-set threshold in the dynamic rule strategy source code.

From block 520, pruning data can be transmitted to the rule refinement phase from the stratified random sampling along with the rule set from split/stop determination block 530. The rule refinement phase includes cost complexity pruning at block 540, rule performance evaluation at block 542, and Monte Carlo cross validation at block 546. Monte Carlo Cross Validation is utilized in the developmental testing to demonstrate the robustness and stability of the dynamic rule strategy.

With respect to pruning, after building the fully grown tree, the dynamic rule strategy examines different pruned subtrees of this tree and compares their performance on a pruning dataset. The purpose is to reduce the complexity of the final classifier, and hence improve predictive accuracy by the reduction of over fitting. To prune a tree T in a node t means that t becomes a leaf node and all its descendants are removed. Since the number of rooted subtrees of a binary tree is very large, it may not be feasible to compare them all on a pruning set. Hence, cost-complexity pruning (CCP) is used to navigate this family of subtrees. The basic idea of CCP is not to consider all pruned subtrees, but only those that are the "best of their kind". The rule refinement process then selects the final tree from this subtree sequence created with CCP by picking the one with the lowest misclassification error rate on a prune dataset. The estimated misclassification rate of tree T on a prune dataset is designated by $R^{ts}(T)$. Experiments have shown that usually there is quite a long subsequence of trees with error rates close to each other. Experiments have also shown that the tree size that achieves the minimum within this long flat valley is quite sensitive to the transaction data selected for training. To reduce this instability, the smallest tree with $R^{ts}$ within one standard error of the minimum is selected per the 1-SE rule (Breiman et al. [1984]).

Note. The standard error of $R^{ts}$ as an estimate of the true error rate $R^s$ can be computed as follows:

$$SE(R^{ts}) = \sqrt{\frac{R^{ts}(1 - R^{ts})}{n_{prune}}},$$

where $n_{prune}$ is the number of transaction data in the prune dataset.

The Monte-Carlo cross validation may result in an additional data split. After Monte-Carlo cross validation in block 546, the system may perform Kolmogorov-Smirnov (KS), Receiver Operating Characteristic (ROC), and bad capture in block 548 and outputs rules in Statistical Analysis Software (SAS) data step format in block 550. The outputs are dynamic rule strategy score. The dynamic rule strategy score represents the probability (between 0.0 and 1.0) that POS transaction is fraudulent. The dynamic rule strategy score is not for the entire portfolio, but rather for the segments identified based on the fraud trending analysis by the automatic trigger identification engine. The transactions that fall into the same node receive the same score. The set of rules corresponds to the decision tree leaf nodes. The process is complete in block 552.

The system as illustrated in the block diagrams and flowcharts of FIGS. 1-5 includes one or more computer processors capable of accessing stored data and instructions to perform various steps and may operate in conjunction with software modules described herein in order to perform various functions. Many processors may be suitable and will be further described below. All of the described engines, generators, and other components may be or include software modules that are executed by the processor to perform their stated functions. Although the software modules are shown as discrete components, they may be integrated in various ways in accordance with embodiments of the invention.

All of the components shown in the FIGs. above may be, include, or be implemented by a computer or multiple computers. The system of the invention or portions of the system of the invention may be in the form of a "processing machine," i.e. a tangibly embodied machine, such as a general purpose computer or a special purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as any of the processing as described herein. Such a set of instructions for performing a particular task may be characterized as a program, software program, or simply software.

As noted above, the processing machine, which may be constituted, for example, by the particular system and/or systems described above, executes the instructions that are stored in the memory or memories to process data. This processing of data may be in response to commands by a user or users of the processing machine, in response to previous processing, in response to a request by another processing machine and/or any other input, for example. As noted above, the processing machine used to implement the invention may be a general purpose computer. However, the processing machine described above may also utilize (or be in the form of) any of a wide variety of other technologies including a special purpose computer, a computer system including a microcomputer, mini-computer or mainframe for example, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform. It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications and equivalent arrangements.

While particular embodiments of the invention have been illustrated and described in detail herein, it should be understood that various changes and modifications might be made to the invention without departing from the scope and intent of the invention.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the disclosed invention.

What is claimed is:

1. A dynamic rule strategy and fraud detection system for detecting fraud trends, the system comprising:
    at least one computer memory storing transaction data;
    at least one computer server including at least one processor for executing components including:
        an automated trigger identification engine for continuously monitoring captured transaction data for detecting a concentration of fraud attacks in selected segments, the automated trigger notification engine operating during a fraud observation window from a time of a transaction to the execution of the dynamic rule strategy;
        an adaptive rule induction engine for receiving the selected segments identified by the automated trigger identification engine and developing a set of fraud detection rules based on the selected segments by automatically identifying new fraud trends and/or emerging fraud attacks, automatically constructing associated development data for strategy creation; and automatically conducting rule induction; and
        a control engine for validating and implementing the fraud detection rules, wherein
    during each execution of the dynamic rule strategy:
        pulling recent transactional data;
        selecting new attributes corresponding to selected segments;
        developing a new set of fraud detection rules based on the selected attributes; and
        validating the developed new set of fraud detection rules,
        wherein the control engine automatically transfers the validated developed new set of fraud detection rules to a production system for implementation, resulting in a reduction in reaction time to emerging fraud trends.

2. The system of claim 1, wherein the adaptive rule induction engine utilizes a tree based classification method to differentiate the risk between transactions, dynamically examines different pruned subtrees of a tree that differentiates the risk between transactions, and compares the different pruned subtrees' performance on a pruning dataset wherein the process of pruning includes removing all descendants of a leaf node.

3. The system of claim 1, wherein the adaptive rule induction engine continues tree building until all transactions in a node belong to a single target class.

4. The system of claim 1, wherein the adaptive rule induction engine continues tree building until a number of transactions in one or more child nodes is less than a preset threshold.

5. The system of claim 1, wherein the adaptive rule induction engine continues tree building until a best split is less than or equal to a pre-set threshold.

6. The system of claim 1, further comprising a user interface providing one step activation of the fraud detection process.

7. The system of claim 1, wherein the selected segments are pre-defined based on user preferences.

8. The system of claim 1, wherein the selected segments are selected based on detection of fraud by the automated trigger identification engine.

9. A dynamic rule strategy and fraud detection method for detecting fraud trends, the method comprising:
    storing captured transaction data in at least one data warehouse;
    utilizing a computer server including at least one processor for performing steps including:
        continuously monitoring the captured transaction data using an automated trigger identification engine for detecting a concentration of fraud attacks in selected segments, the automated trigger notification engine operating during a fraud observation window from a time of a transaction to the execution of the dynamic rule strategy;

receiving, at an adaptive rule engine, the selected segments identified by the automated trigger identification engine and developing a set of fraud detection rules based on the selected segments by automatically identifying new fraud trends and/or emerging fraud attacks, automatically constructing associated development data for strategy creation; and automatically conducting rule induction; and validating and implementing the fraud detection rules using a control engine, wherein during each execution of the dynamic rule strategy:
pulling recent transactional data;
selecting new attributes corresponding to selected segments;
developing a new set of fraud detection rules based on the selected attributes; and
validating the developed new set of fraud detection rules,
wherein the control engine automatically transfers the validated developed new set of fraud detection rules to a production system for implementation, resulting in a reduction in reaction time to emerging fraud trends.

10. The method of claim 9, wherein the adaptive rule induction engine utilizes a tree based classification method to differentiate the risk between card transactions, and the method further comprising:
dynamically examining different pruned subtrees of a tree that differentiates the risk between transactions; and
comparing the different pruned subtrees' performance on a pruning dataset wherein the process of pruning includes removing all descendants of a leaf node.

11. The method of claim 9, wherein the adaptive rule induction engine continues tree building until all transactions in a node belong to a single target class.

12. The method of claim 9, wherein the adaptive rule induction engine continues tree building until a number of transactions in one or more child nodes is less than a preset threshold.

13. The method of claim 9, wherein the adaptive rule induction engine continues tree building until a best split is less than or equal to a pre-set threshold.

14. The method of claim 9, further comprising providing a user interface providing one step activation of the fraud detection process.

15. The method of claim 9, wherein the selected segments are pre-defined based on user preferences.

16. A non-transitory computer readable medium storing instructions executable by at least one processor for performing a dynamic rule strategy and fraud detection method for detecting fraud trends by executing instructions to perform steps including:
storing captured transaction data in at least one data warehouse;
continuously monitoring the captured transaction data using an automated trigger identification engine for detecting a concentration of fraud attacks in selected segments, the automated trigger notification engine operating during a fraud observation window from a time of a transaction to the execution of the dynamic rule strategy;
receiving, at an adaptive rule engine, the selected segments identified by the automated trigger identification engine and developing a set of fraud detection rules based on the selected segments by automatically identifying new fraud trends and/or emerging fraud attacks, automatically constructing associated development data for strategy creation; and automatically conducting rule induction; and
validating and implementing the fraud detection rules using a control engine, wherein
during each execution of the dynamic rule strategy:
pulling recent transactional data;
selecting new attributes corresponding to selected segments;
developing a new set of fraud detection rules based on the selected attributes; and
validating the developed new set of fraud detection rules,
wherein the control engine automatically transfers the validated developed new set of fraud detection rules to a production system for implementation, resulting in a reduction in reaction time to emerging fraud trends.

17. The non-transitory computer readable medium according to claim 16, wherein the adaptive rule induction engine utilizes a tree based classification method to differentiate the risk between card transactions, and the fraud detection method further comprising:
dynamically examining different pruned subtrees of a tree that differentiates the risk between transactions; and
comparing the different pruned subtrees' performance on a pruning dataset wherein the process of pruning includes removing all descendants of a leaf node.

* * * * *